PIVOT ARM CONSTRUCTION

Filed Sept. 14, 1959 5 Sheets-Sheet 1

INVENTORS
DANIEL M. SCHWARTZ
THEODORE N. HACKETT
BY Harold T. Stowell
Harold L. Stowell ATTORNEYS Dec. 25, 1962 D. M. SCHWARTZ ETAL 3,070,245

PIVOT ARM CONSTRUCTION

Filed Sept. 14, 1959 5 Sheets-Sheet 2

INVENTORS
DANIEL M. SCHWARTZ
THEODORE N. HACKETT

BY Harold T. Stowell
Harold L. Stowell

ATTORNEYS

PIVOT ARM CONSTRUCTION

Filed Sept. 14, 1959 5 Sheets-Sheet 3

INVENTORS
DANIEL M. SCHWATZ
THEODORE N. HACKETT

BY Harold T. Stowell
Harold T. Stowell
ATTORNEYS

PIVOT ARM CONSTRUCTION

Filed Sept. 14, 1959 5 Sheets-Sheet 4

INVENTORS
DANIEL M. SCHWARTZ
THEODORE N. HACKETT

BY Harold T. Stowell
Harold L. Stowell

ATTORNEYS

Dec. 25, 1962 D. M. SCHWARTZ ETAL 3,070,245

PIVOT ARM CONSTRUCTION

Filed Sept. 14, 1959 5 Sheets-Sheet 5

INVENTORS
DANIEL M. SCHWARTZ
THEODORE N. HACKETT
BY Harold T. Stowell
Harold L. Stowell
ATTORNEYS

1

3,070,245

PIVOT ARM CONSTRUCTION

Daniel M. Schwartz and Theodore N. Hackett, Salt Lake City, Utah, assignors to The Eimco Corporation, Salt Lake City, Utah, a corporation of Delaware Filed Sept. 14, 1959, Ser. No. 839,903

2 Claims. (Cl. 214—145)

This invention relates to an improved pivot arm construction for a material handling machine and, in particular, to a cast or forged arm construction that has minimum weight with maximum strength and rigidity with substantially complete elimination of zones of stress concentration and sharp corners.

A material handling machine, such as disclosed in United States patent application Serial No. 820,385, Daniel M. Schwartz et al., filed June 15, 1959, often includes as the material handling attachment a pivot arm to the forward end of which is mounted a material handling implement such as a shovel bucket, fork loader, or the like. The other end of the arm is pivotally connected to hydraulic rams and the like for positioning the material handling implement at a low material gathering and/or discharge position and an elevated discharge and/or transport position.

In the past the main lift arms for such material handling machines have been constructed from heavy plates with bosses and attachments to provide the necessary connecting points to the vehicle. Such arms were mainly constructed of flat rolled plate and it was impossible to provide such arms with additional strength where needed without adding welded reinforcement and smooth connections could not be obtained for the various pin-connecting points between the arm and the vehicle. Such constructions were expensive to produce and also produced high stress concentrations at the sharp junctions of the added plate members and introduced eccentric loading from the push of the pivoting cylinders.

It is, therefore, a principal object of the present invention to provide a cast or forged pivot arm construction that has minimum weight with maximum strength and rigidity and wherein the distribution of metal to obtain strength where needed and reduced weight where high strength is not required is readily accomplished.

A further object is to provide such a cast or forged construction having maximum strength in the vertical direction to resist high digging forces of the bucket; high strength and rigidity in the horizontal direction; and great resistance to bending deflection due to uneven loading of the material handling implement.

These and other objects and advantages are provided in a cast or forged pivot arm construction for a material handling machine comprising a generally U-shaped structure including a pair of elongate leg members positioned in spaced parallel relationship, each of said elongate leg members being substantially C-shape in transverse cross-section and including terminal portions interconnected by a web portion, pivot arm connection points formed from expanded terminal portions of said C-sections, the terminal portions of said C-section between said pivot arm connection points being expanded into continuous bulbs smoothly contoured into the web portion of the C-section.

The invention will be more particularly described with reference to the accompanying illustrations wherein.

2

Figure 1:
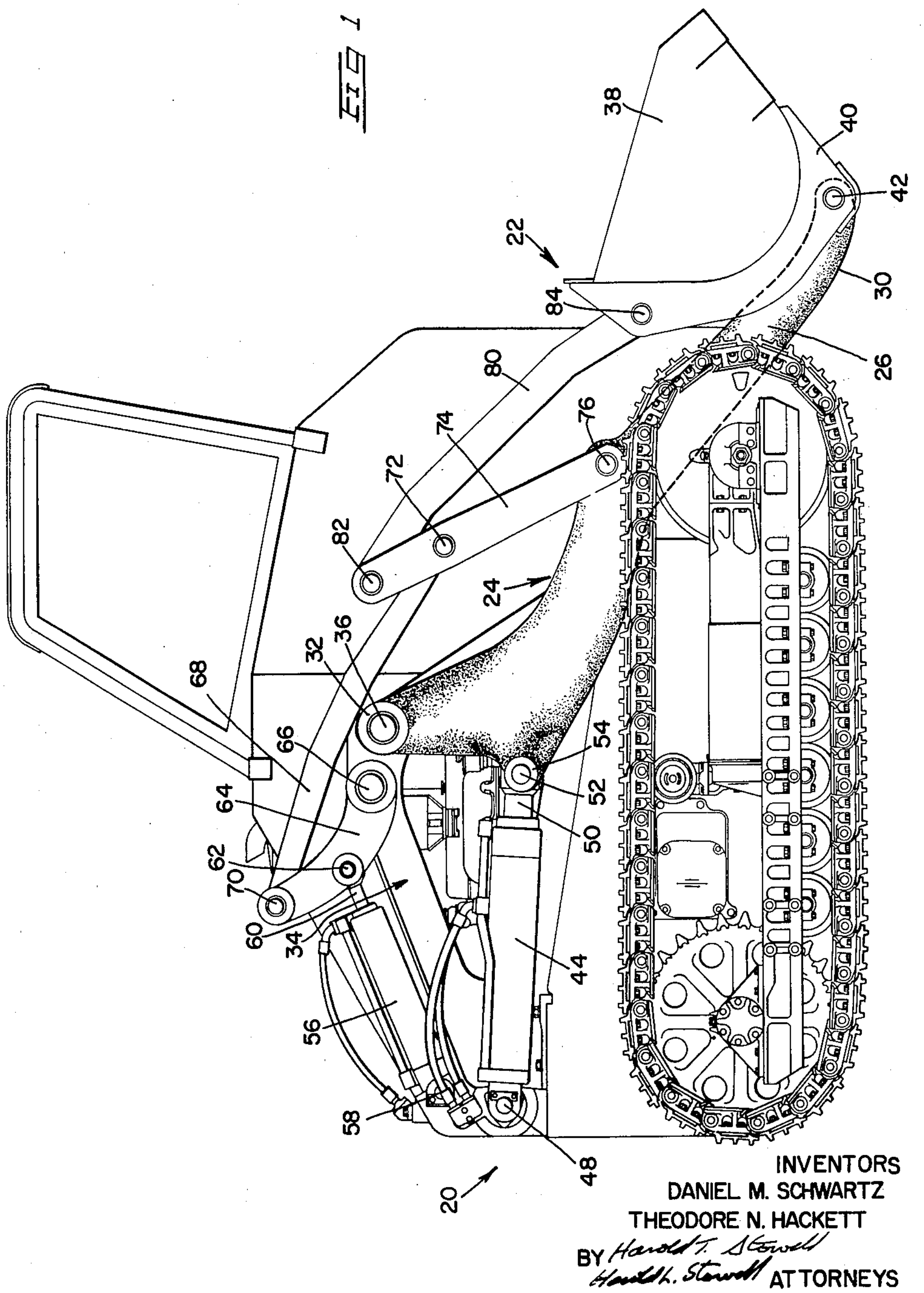
FIG. 1 is a side elevation of a material handling machine, incorporating the improved pivot arm construction of the present invention.
Figures 2, 3:
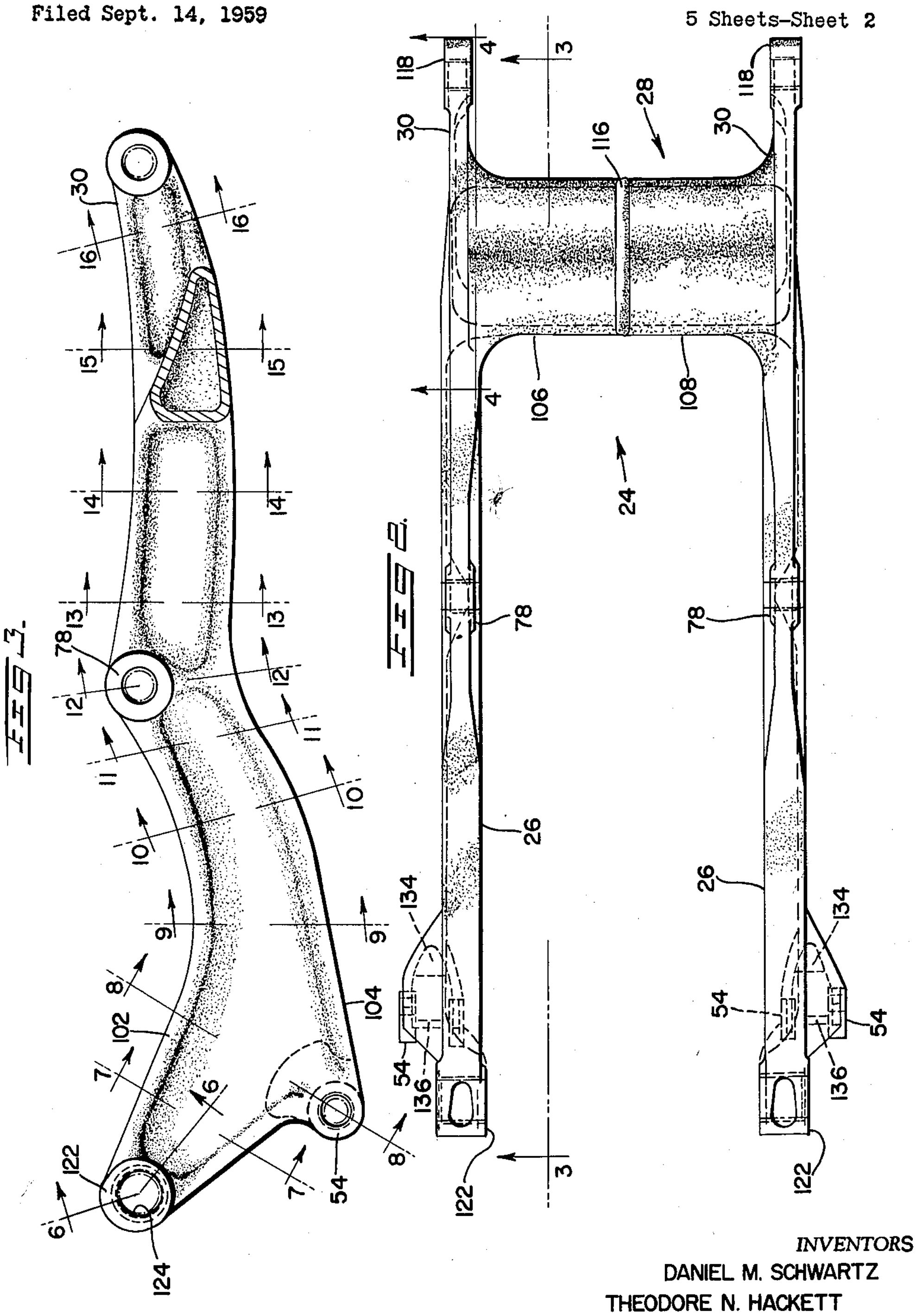
FIG. 2 is a top plan view of the improved pivot arm shown in FIG. 1.
FIG. 3 is a transverse section substantially on line 3—3 of FIG. 2.
Figure 4:
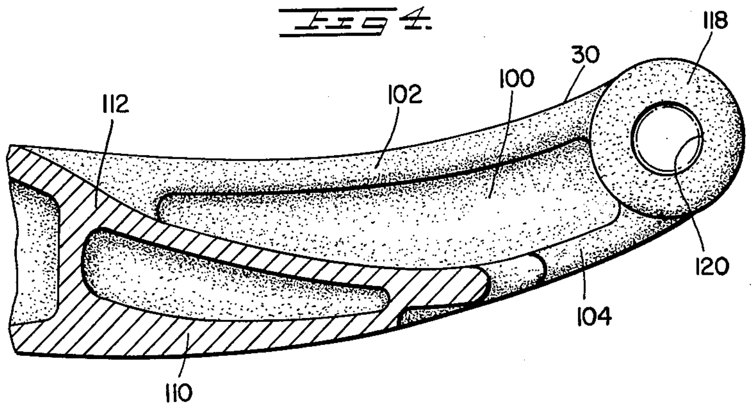
Figure 5:
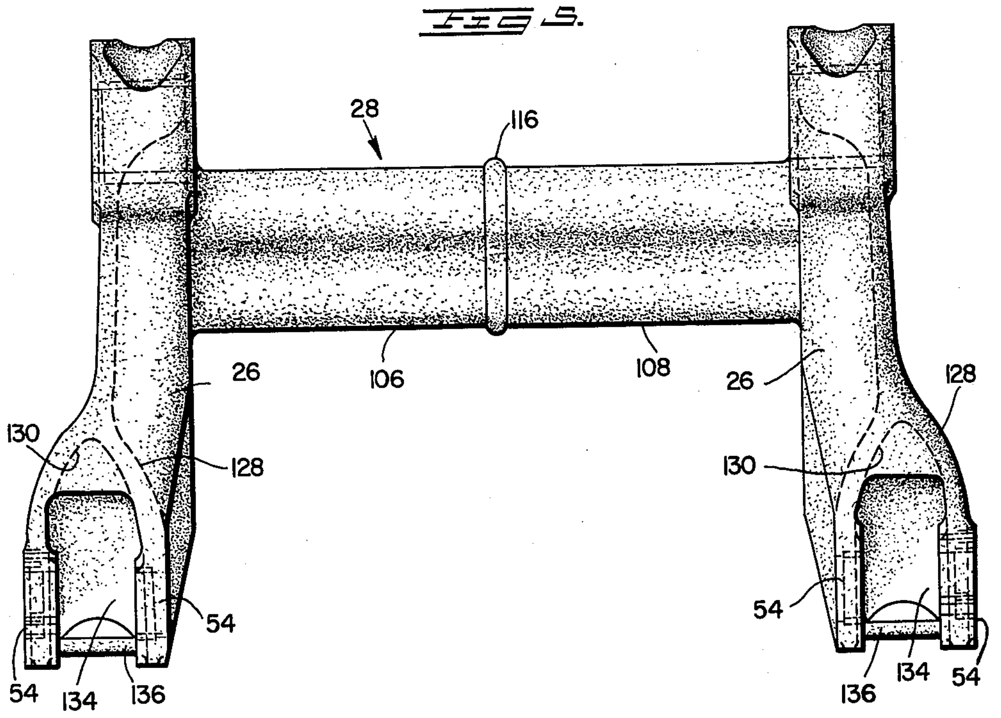
Figure 6:
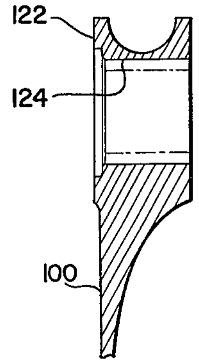
Figure 7:
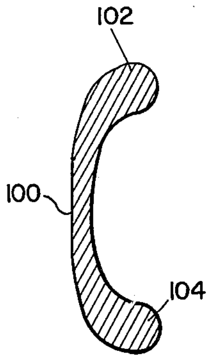
Figure 8:
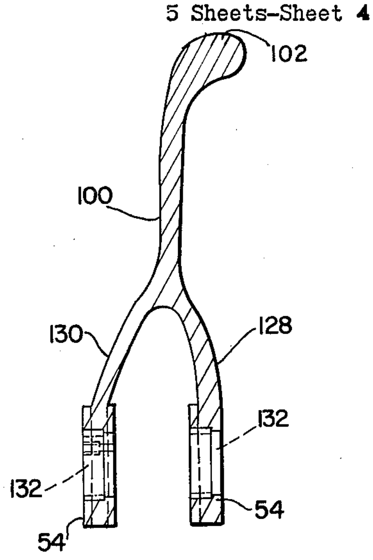
Figure 9:
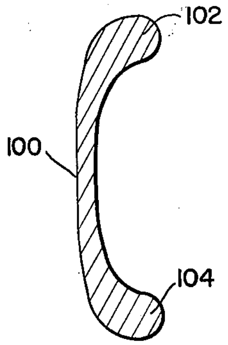
Figure 10:
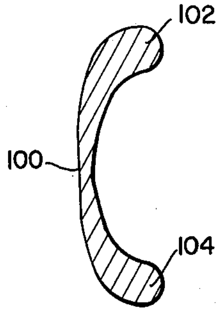
Figure 11:
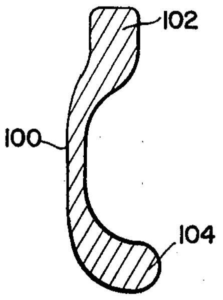
Figure 12:
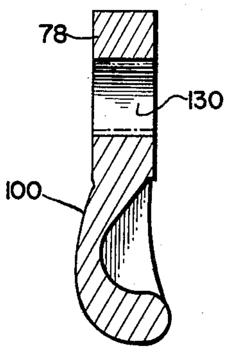
Figure 13:
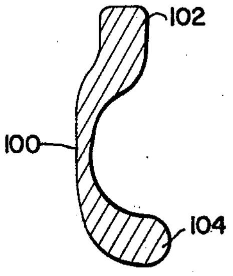
Figure 14:
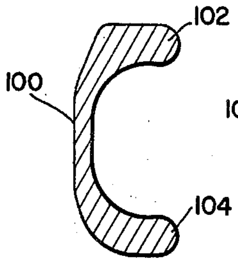
Figure 15:
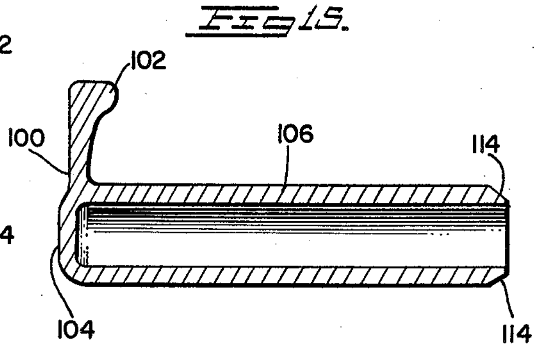
Figure 16:
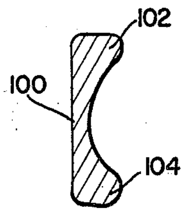

FIG. 4 is a fragmentary enlarged section through the transverse member of the U-shaped pivot arm on line 4—4 of FIG. 2;

FIG. 5 is a rear end elevational view of the pivot arm shown in FIG. 1;

FIG. 6 is an enlarged fragmentary true section view on line 6—6 of FIG. 3;

FIG. 7 is an enlarged true section on line 7—7 of FIG. 3;

FIG. 8 is an enlarged true section on line 8—8 of FIG. 3;

FIG. 9 is an enlarged true section on line 9—9 of FIG. 3;

FIG. 10 is an enlarged true section on line 10—10 of FIG. 3;

FIG. 11 is an enlarged true section on line 11—11 of FIG. 3;

FIG. 12 is an enlarged true section on line 12—12 of FIG. 3;

FIG. 13 is an enlarged true section on line 13—13 of FIG. 3;

FIG. 14 is an enlarged true section on line 14—14 of FIG. 3;

FIG. 15 is an enlarged true section on line 15—15 of FIG. 3 showing the hollow transverse web construction of the pivot arm of the present invention; and FIG. 16 is an enlarged true section on line 16—16 of FIG. 3;

Referring to the drawings and, in particular, to FIGS. 1–3 thereof, a land vehicle 20 is illustrated and includes as the material handling superstructure a front end loading bucket mechanism 22. The front end loading structure 22 includes a cast generally U-shaped pivot arm generally designated 24. The pivot arm 24 includes a pair of elongate leg members generally designated 26 positioned in spaced generally parallel relationship by an integral transverse element 28 connecting the leg members 26 at their forward ends 30, as to be more clearly described hereinafter.

Each of the leg members 26 of the pivot arm structure is mounted as at 32 to the superstructure 34 of the vehicle by pivot pin means 36. At the extended ends 30 of the pivot arm 24 is pivotally mounted a shovel bucket 38 or other bulk material handling device. The lower end 40 of the illustrated shovel bucket is pivotally mounted to each leg member 26 by pivot pin means 42.

The arm structure 24 is pivoted from a low forward position as shown in the drawings to an upwardly extended position by a pair of hydraulic rams 44, one of the pair being positioned on each side of the superstructure 34 of the vehicle. Each hydraulic ram 44 is pivotally mounted to the superstructure 34 of the vehicle by pivot pin means 48 while the extended end of each piston rod 50 is connected by a pivot pin 52 to the boss portion 54 of its leg member below said leg member's pivotal connection 32 to the superstructure 34 of the vehicle 20.

The material handling structure also includes means for pivoting the bucket 38 relative to the pivot arm structure 24. The means for pivoting the bucket 38 includes a pair of hydraulic rams 56, one of the pair being positioned on each side of the superstructure 34 of the vehicle. Each ram 56 is mounted to the superstructure 34 by pivot pin means 58 while the other end 60 of each ram 56 is pivoted by pin means 62 to its respective bell crank 64. Each bell crank 64 is also pivoted by pin means 66 to the superstructure 34 on its side of the vehicle and to its respective arm member 68 by pivot pin means 70.

The other end of each arm member 68 is center-connected by pin means 72 to its respective cross arm 74. One end of each of the cross arms 74 is connected by pin means 76 to a boss 78 formed integrally with each of the respective leg portions 26 of the pivot arm structure 24, generally intermediate the ends thereof. The other end of each of the cross arms 74 is pivotally mounted to its respective link or rod 80 by pivot pin means 82. The lower end of each of the links 80 is connected by pivot pin means 84 to a portion of the shovel bucket 38 at a point spaced from the pivotal connection between the ends 30 of each leg member 26 and the bucket.

With this form of construction, upon directing pressure fluid, from a source of pressure fluid, to the rear ends of the hydraulic rams 44, the arm structure 24 pivots about the axis of each pivot pin 32 whereby the lower end 30 of each of the leg members 26 of the pivot arm structure 24 is caused to swing in an upwardly directed arc about its pivot pin 32 raising the shovel bucket 38.

By directing pressure fluid to the rear end of each of the hydraulic rams 56 the shovel bucket 38 is caused to pivot about pivot pins 42 for dumping, positioning or picking up structures in the bucket 38 or other material handling implement carried at the extended ends of the pivot arm structure 24. Directing pressure fluid in the reverse manner to hydraulic rams 44 permits the pivot arm structure to position the material handling implement 38 adjacent the ground and directing pressure fluid to the other ends of the pair of hydraulic rams 56 rolls back bucket 38.

Referring particularly to FIGS. 2 through 16 of the drawings, details of the construction of the improved pivot arm structure 24 will be described.

Each of the elongate leg members 26 of the pivot arm structure 24 is substantially C-shaped in transverse cross-section as is more clearly illustrated in sectional drawings 7, 9, 10, 11 through 14 and 16. Each C-shaped leg member includes a web portion 100 and edge or terminal portions 102 and 104. The edge portions 102 and 104 of each of the C-sections are in the form of continuous bulbs smoothly contoured into the web portion 100 of its C-section.

In assembly of the pair of leg members 26, in spaced generally parallel relationship, the edge portions 102 and 104 of the C-shaped leg members are in opposed spaced relationship. As clearly shown in the sectional views, the basic C-shaped leg members, including the relatively thin central web 100, and the large bulbular edges 102 and 104, smoothly contoured into the web, provide unusual strength and rigidity to the pivot arm construction. The large masses along the edge portions of the C-section provide for maximum strength in the vertical direction to resist high digging forces of the material handling attachment carried at the extended ends of the leg members. The smoothly curved C-shaped leg members, wherein the central web 100 is offset to the sides from the bulbular edge extremities, provide high strength and rigidity in the horizontal direction, and provide great resistance to bending deflection in a sideways direction due to uneven loading on for example, the bucket 38, such as obtained when the bucket is hooked under a load at one side of the bucket or when side forces are imposed on the shovel bucket due to turning of the material handling machine.

The two leg members 26 of the assembly are maintained in spaced generally parallel relationship by the transverse member 28 as hereinbefore described. In order to reduce the size and the complexity of the pivot arm former, each leg member with one-half of the transverse member is separately cast or forged. Thus each of the sections 106 and 108 of the transverse member is integrally formed with its respective leg member 26. Further, in order to reduce the weight of the transverse member 28, each of the portions 106 and 108 is of hollow tubular form and generally triangular in cross-section as more clearly shown in FIGS. 3 and 4. The base 110 of each half of the generally triangular-shaped transverse member is formed integrally with its respective edge bulb 104 while the apex 112 of each half of the transverse member is smoothly contoured into its respective edge bulbular portion 102.

Following the forming of the two leg portions 26 and their integral transverse elements 106 and 108, the mating edges of the transverse elements are bevelled as at 114, as illustrated in FIG. 15 of the drawings, and the bevel is fill welded as illustrated in FIGS. 2 and 5 at 116.

While a welded construction is illustrated in the drawings, it will be apparent that the two legs and the entire transverse member 28 may be formed as a unit with the transverse member 28 being of hollow or solid configuration in cross section.

At the forward end 30 of each of the leg members 26, the two edge bulbs 102 and 104 are smoothly contoured into a boss 118 which boss is bored as at 120 to receive pivot pins 42 for pivotally mounting the material handling implement 38 thereto. The contoured formation of the bosses 18 eliminate areas of stress concentration and materially improve the strength of the pivot arm without materially increasing the weight of the arm.

The main connections between the leg members 26 and the superstructure 34 of the material handling machine are at bosses 122. Bosses 122, like bosses 118, are smoothly contoured from the expanded continuous bulb-like edge or terminal portions of each of the legs. Each boss 122 is bored as at 124 to receive its respective pivot pin 36.

Boss portion 54 forming the connection between the main lift ram 44 for each arm is also smoothly contoured from the lower edge bulbular portion 104 of the leg member and, as more clearly illustrated in FIGS. 2, 5 and 8, boss portion 54 of each arm may be of the bifurcated form whereby the extended end of each of the hydraulic rams 44 is received between the furcations 128 and 130 of the rearward portion of the web 100. Where such clevis construction is employed the lower edge portion 104 is separated to include the paired spaced bosses 54 which are bored as at 132 to receive their respective pivot pins 52. The bulbular portion 104 also is smoothly contoured into strengthening web portions 134 and 136 for the clevis section of each of the leg members 26.

Boss 78 of each leg member 26, to which the lower end of each cooperating cross-arm 74 is pivotally mounted, is smoothly contoured with the edge portion 102 of its leg member. The bosses 78 are each bored as at 130 to receive its pivot pin means 76.

From the foregoing description, it will be seen that the present invention provides a greatly improved pivot arm construction for a material handling machine to obtain maximum rigidity and strength in the element with minimum weight. It will also be apparent to those skilled in the art that various modifications may be made in the specific form of the disclosed structure without departing from the inventive concepts as defined in the appended claims. For example, the strengthening webs 134 and 36 for the clevis portion of each leg member may be formed as a single web and the other bosses providing points of pivotal connection may be bifurcated as described with reference to bosses 54.

Further, it wil be apparent that the transverse member 28 is not required on all types of loading devices as the material handling implement may be rigidly attached to the opposed arms 26 to space the arms and provide the necessary rigidity therebetween.

We claim:

1. A formed pivot arm for a material handling machine comprising an integral generally U-shaped structure including a pair of elongate leg members positioned in spaced parallel relationship, each of said elongate leg members being substantially C-shaped in transverse cross-section and including terminal edge portions interconnected by a web portion, said web generally decreasing in thickness from each of the terminal edge portions inwardly to provide high strength with a minimum of weight, pivot arm connection points formed from expanded terminal edge portions of said C-sections, the terminal edge portions of said C-section between said pivot arm connection points being expanded into continuous bulbs smoothly contoured into the web portion of the C-section, and pivot pin connecting bosses on each of said leg members contoured into said terminal edge portion bulbs.

2. A formed pivot arm for a material handling machine comprising an integral generally U-shaped structure including a pair of elongate leg members positioned in spaced parallel relationship by an integral transverse element connecting said leg members adjacent one end thereof, each of said elongate leg members being substantially C-shaped in transverse cross-section and including terminal edge portions interconnected by a web portion, said web generally decreasing in thickness from each of the terminal edge portions inwardly to provide high strength with a minimum of weight, pivot arm connection points formed from expanded terminal edge portions of said C-sections, the terminal edge portions of said C-section between said pivot arm connection points being expanded into continuous bulbs smoothly contoured into the web portion of the C-section, a clevis portion formed in each of said leg members adjacent the end remote from the transverse element and pivot pin connecting bosses on each of said leg members contoured into said terminal edge portion bulbs.

References Cited in the file of this patent

UNITED STATES PATENTS

| | | |
|---|---|---|
| 551,523 | Bogshowe | Dec. 17, 1895 |
| 2,821,313 | Warner | Jan. 28, 1958 |
| 2,846,096 | Beyerstedt | Aug. 5, 1958 |

FOREIGN PATENTS

| | | |
|---|---|---|
| 1,848 | Great Britain | Feb. 9, 1886 |
| 449,668 | Great Britain | July 1, 1936 |
| 458,913 | Canada | Aug. 16, 1949 |

OTHER REFERENCES

McCormick-Deering Publication "No. 30 Power Loader" A–149–JJ. 12–12–II Reproduce illustration on page 3, received in Div. 4 Jan. 20, 1959.